(12) United States Patent
Desbois

(10) Patent No.: US 9,132,722 B2
(45) Date of Patent: Sep. 15, 2015

(54) GLAZED ROOF HAVING A SLIDING AND TILTING MOBILE PANEL

(75) Inventor: Mickaël Desbois, Parthenay (FR)

(73) Assignee: Advanced Comfort Systems France SAS—ACS France, Bressuire Cedex (FR)

(*) Notice: Subject to any disclaimer, the term of this patent is extended or adjusted under 35 U.S.C. 154(b) by 0 days.

(21) Appl. No.: 14/009,713

(22) PCT Filed: Mar. 28, 2012

(86) PCT No.: PCT/EP2012/055525
§ 371 (c)(1),
(2), (4) Date: Feb. 17, 2014

(87) PCT Pub. No.: WO2012/136540
PCT Pub. Date: Oct. 11, 2012

(65) Prior Publication Data
US 2014/0159434 A1    Jun. 12, 2014

(30) Foreign Application Priority Data
Apr. 4, 2011 (FR) ...................................... 11 52894

(51) Int. Cl.
*B60J 7/043* (2006.01)
(52) U.S. Cl.
CPC ...................................... *B60J 7/043* (2013.01)
(58) Field of Classification Search
CPC ........................................................ B60J 7/043
USPC ........................................... 296/216.01–224
See application file for complete search history.

(56) References Cited

U.S. PATENT DOCUMENTS

| 5,154,482 A * | 10/1992 | Hayashi et al. ............... 296/223 |
| 6,012,768 A * | 1/2000 | Nabuurs et al. .......... 296/216.03 |
| 7,644,980 B2 | 1/2010 | Hager et al. |

FOREIGN PATENT DOCUMENTS

| DE | 20309889 U1 | 8/2003 |
| DE | 102005032437 A1 | 1/2007 |
| DE | 102006062543 A1 | 7/2008 |
| DE | 102007004258 A1 | 7/2008 |

OTHER PUBLICATIONS

French Search Report and Written Opinion dated Oct. 27, 2011 for corresponding French Application No. 1152894, filed Apr. 4, 2011.

(Continued)

*Primary Examiner* — Dennis H Pedder
(74) *Attorney, Agent, or Firm* — Hamre, Schumann, Mueller & Larson, P.C.

(57) ABSTRACT

A glass roof of a motor vehicle includes a fixed part and a panel that is mobile with respect to the fixed part. The panel is able to close an opening formed in or next to the fixed part in a closed position. Movement of the mobile panel is implemented with the aid of two shuttles guided in translation respectively in two rails, each of the shuttles engaging with a peg secured to the mobile panel. The mobile panel carries two bearing elements that bear against bearing surfaces formed respectively on a longitudinal portion of the rails, defining a third movement zone in which the mobile panel is slid with respect to the fixed part, parallel to the rails. The bearing surface is interrupted in an end portion of each of the rails so as to allow the bearing elements to move in a direction perpendicular to the rails.

8 Claims, 17 Drawing Sheets

(56) References Cited

OTHER PUBLICATIONS

International Preliminary Report on Patentability and Written Opinion in English dated May 22, 2012 for corresponding International Patent Application No. PCT/EP2012/055525, filed Mar. 28, 2012, 5 pages.

International Search Report in English dated May 22, 2012 for corresponding International Patent Application No. PCT/EP2012/055525, filed Mar. 28, 2012, 4 pages.

* cited by examiner

GLAZED ROOF HAVING A SLIDING AND TILTING MOBILE PANEL

1. CROSS-REFERENCE TO RELATED APPLICATIONS

This Application is a Section 371 National Stage Application of International Application No. PCT/EP2012/055525, filed Mar. 28, 2012, which is incorporated by reference in its entirety and published as WO 2012/136540 on Oct. 11, 2012, not in English.

2. FIELD OF THE INVENTION

The field of the invention is that of glazed bays or openings for motor vehicles and, more specifically, for the roofs of such vehicles.

More specifically, the invention pertains to such closing-off devices, comprising at least one aperture cooperating with a sliding, mobile, glazed panel, and especially devices known as "flush bays" or "flush openings", designed to be mounted so as to be flush with the bodywork.

Within the context of the present patent application, the term "glazed panel" refers to any panel that is fixed or mobile relative to the bodywork and substantially transparent or translucent, contributing to the window surface allowing light transmission. Such a panel can be made out of glass or any other appropriate material such as polycarbonate.

In certain embodiments, the panel can be constituted by several elements that are flush when seen from the exterior. Where applicable, at least one of these elements may be opaque and made, for example, of metal or plastic. Besides, the edges of a glazed panel can be opacified, for example by screen printing.

A device according to the invention can furthermore be fitted into a bay or opening formed in a substantially horizontal part other than the roof of the vehicle

3. PRIOR-ART TECHNIQUES

It is presently sought, for motor vehicles, to offer increasing amounts of glazed surface. Thus, in particular, vehicles have been proposed having a roof equipped with one or more glazed elements. In certain cases, the entire roof is made of glass or of a similar material letting through light and especially the sun's rays.

Solutions have also been proposed to make apertures in the roof especially to be able to form a sunroof module.

Thus, a widespread technique for opening an aperture in the roof consists in making a movable window glass element, mounted on a frame, tilt towards the exterior of the vehicle around a shaft attached to the plane of the roof, in order to clear a passage between the window glass element and the frame.

Another sunroof technique also used consists in making the window glass movable above or below the roof in a plane substantially parallel to the plane of the roof.

It has also been proposed to combine these two approaches and apply them alternatively in opening the mobile panel partially (make it ajar) or opening the aperture totally by retracting the movable panel.

One drawback of these prior-art techniques is that they require complex means to control the different motions that have to be applied to the mobile panel, depending on each case:

releasing or swinging, to pass from the closed position, in which the mobile panel is situated in the plane of the fixed panel of the roof, to a parallel plane enabling the sliding;

sliding, to move the mobile panel away from the aperture, and to bring it above the aperture;

tilting to provide opening.

These distinct motions imply that there is a large number of movable parts, and therefore a relatively great space requirement and weight as well as relatively complex assembly, adjusting and maintenance (it may be recalled especially that it is necessary to always provided tight sealing in the closed position).

The motor drive of these different movements is also complex.

The space requirement and complexity of these means is a drawback that is all the greater as the roof is glazed since it is then necessary, by means of screen printing, to conceal the different mechanical parts. This runs counter to the goal of maximizing the glazed surface, or the surface allowing light transmission.

4. SUMMARY OF THE INVENTION

An embodiment of the invention relates to a glazed roof for a motor vehicle comprising a fixed part and a panel that is mobile relative to the fixed part, capable of closing off an aperture formed in or beside said fixed part in a closing-off position, the moving of said mobile panel being implemented by means of two shuttles respectively guided in translation in two rails, each of said shuttles cooperating with a pin that is fixedly attached to said mobile panel.

According to the invention, said mobile panel bears two supporting elements that take support on supporting surfaces formed respectively on a longitudinal portion of said rails defining a third zone of movement in which said mobile panel is moved in sliding relative to said fixed part, parallel to the rails, said supporting surface being interrupted in an end portion of each of said rails so as to enable a movement of said supporting elements in a direction perpendicular to said rails.

Thus, the partial opening and the swinging of the mobile panel are provided simply and by means of a pin that provides for the driving of the shuttles in the guide rails, the sliding of the mobile panel being assisted by the support element which serves as a support for the mobile panel on a surface for guiding the rail, this surface for guiding taking the form of an edge or an extension.

With a movement of the shuttles in only one direction, it is thus possible to provide for the opening and closing of the mobile panel, through sliding in parallel to the fixed panel and through motion to come into the plane of the fixed panel, in the closed position but also to provide for a function of partial opening of the mobile panel, from this closed position.

This mechanism enables complex kinematic configurations for a mobile panel, through a movement of the shuttles that is simple and therefore easily controllable and capable of being motor driven with a reduced number of simple and low-cost elements.

Furthermore, the guiding of the mobile panel is achieved on only one side of the shuttles, thus maximizing the surface allowing light transmission.

It can be noted that the supporting element can take the form of a pin, a skid, a roller or two pins for example.

According to one particular embodiment, said end portions are provided with a termination part that bears a first track configured so that, when the shuttles are moved in said rails, they provide a motion of tilting and/or a motion of swinging of said mobile panel.

The implementing of such a part makes it possible in a simple way to provide for a motion of tilting and/or a motion of swinging of the mobile panel.

In one particular embodiment, the movement of said shuttles in said end portions provides:
   in a first zone of movement, for a motion of a tilting of said mobile panel relative to said fixed part, when said pin is moved in a first portion and a second portion of said first track, and
   in a second zone of movement, a motion of swinging of said mobile panel when said pin moves in a third portion and a fourth portion of said first track.

The tilting for the partial opening is implemented when the pin is moved in the first and second portion of the track made in the termination part, the swinging being implemented when the pin moves in the third and fourth portion of this track.

According to one particular embodiment, the pin has a length greater than that of said supporting element.

The supporting element is designed so that when it takes support on the guiding surface of the rail, the sliding of the mobile panel can be implemented, this supporting element being detached from the guiding surface of the rail during the swinging and the partial opening of the mobile panel.

This supporting element has a length smaller than that of the pin so as not to interfere with the shuttle.

In one particular embodiment, the section of said rail comprises three zones parallel to the axis of said rail, namely:
   a first zone in which said shuttle is guided in translation,
   a second zone in which said termination part is placed, and
   a third zone in which the supporting element gets shifted and said supporting surface extends.

In one particular embodiment, said first track has an "S" shape defining three portions inclined relative to the axis of movement of said shuttle.

According to one particular embodiment, said first track is open at one of its ends so as to get detached from the pin during the passage into said third zone.

Advantageously, each of said shuttles bears a second track cooperating with said pin fixedly attached to said mobile panel.

In this case, said second track has a general "L" shape.

Advantageously, said second track has:
   a first end with which the pin is stopped, during the sliding motion;
   a first portion extending transversally relative to the axis of movement of the shuttle, from said first end, and in which said pin moving during the motion of swinging and at the end of the tilting;
   a second portion extending in parallel to the axis of movement of the shuttle, from said first portion, in which said pin is situated in said closing-off position and at the start of the tilting;
   a second end forming a stop for said pin when the mobile panel is moved towards the closing-off position.

According to one particular implementation, said pins and supporting elements are carried by a flange connected to said mobile panel in the vicinity of a first end of this panel, called a distal end, along the axis of movement of said shuttles.

Advantageously, said mobile panel is fixedly attached, in the vicinity of its second end, called a proximal end, to link rods enabling the control, complementarily to said first pins, of the tilting of the mobile panel.

The invention also pertains to motor vehicles equipped with a roof as described here above.

5. LIST OF FIGURES

Other features and advantages of the invention shall appear more clearly from the following description of one particular embodiment of the invention, given by way of a simple, illustratory and non-exhaustive example and from the appended drawings, of which:

FIGS. 1A to 1C illustrate the upper part of the bodywork of a motor vehicle equipped with a closing-off device, in this case a glazed roof, according to the invention respectively:
   FIG. 1A: mobile panel in closed position;
   FIG. 1B: mobile panel in open position after sliding;
   FIG. 1C: mobile panel in partially open position;

FIGS. 2A to 2D and 3A to 3D respectively provide a schematic view of the means providing for the mobility of the mobile panel firstly in the vicinity of the axis of tilt for partial opening (FIGS. 2A to 2E), i.e. according to FIGS. 1A to 1C on the side of the mobile panel oriented towards the front of the vehicle (here below called the distal end), and secondly in the vicinity of the opposite edge (here below called the proximal end) (FIGS. 3A to 3C):
   FIGS. 2A, 2B and 3A: the mobile panel in the sliding plane;
   FIGS. 2C and 3B: the mobile panel in the partially open position;
   FIG. 2D: the mobile panel being opened or closed, in swinging position;
   FIGS. 2E and 3C: the mobile panel in a closed position, the opening being closed off;

6. DETAILED DESCRIPTION OF ONE EMBODIMENT OF THE INVENTION

The invention therefore pertains to a device for closing off a bay or opening of a motor vehicle formed in or forming a glazed roof. The embodiment described here below therefore pertains to a glazed roof.

Figure 1A:
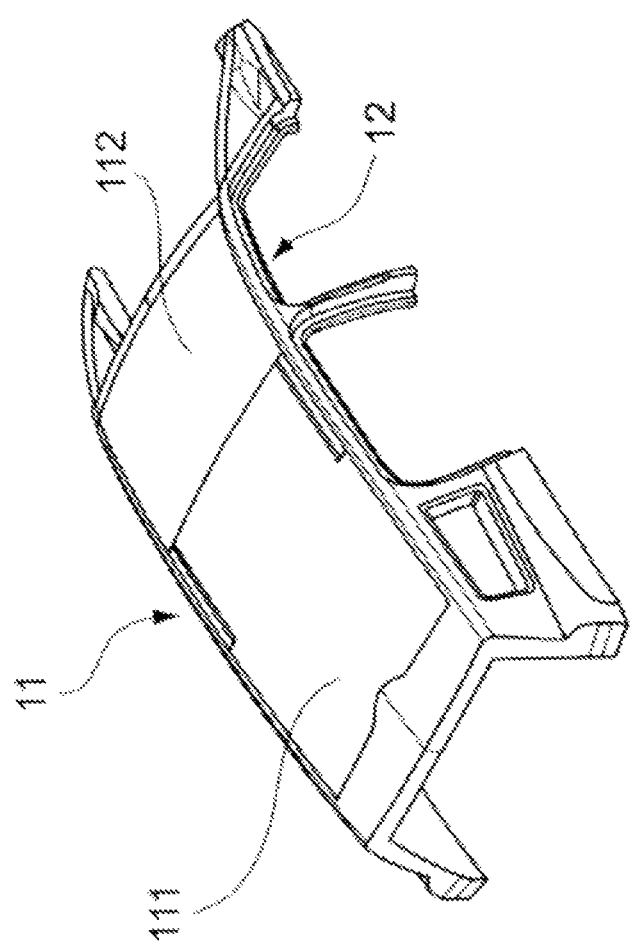
Figure 1B:
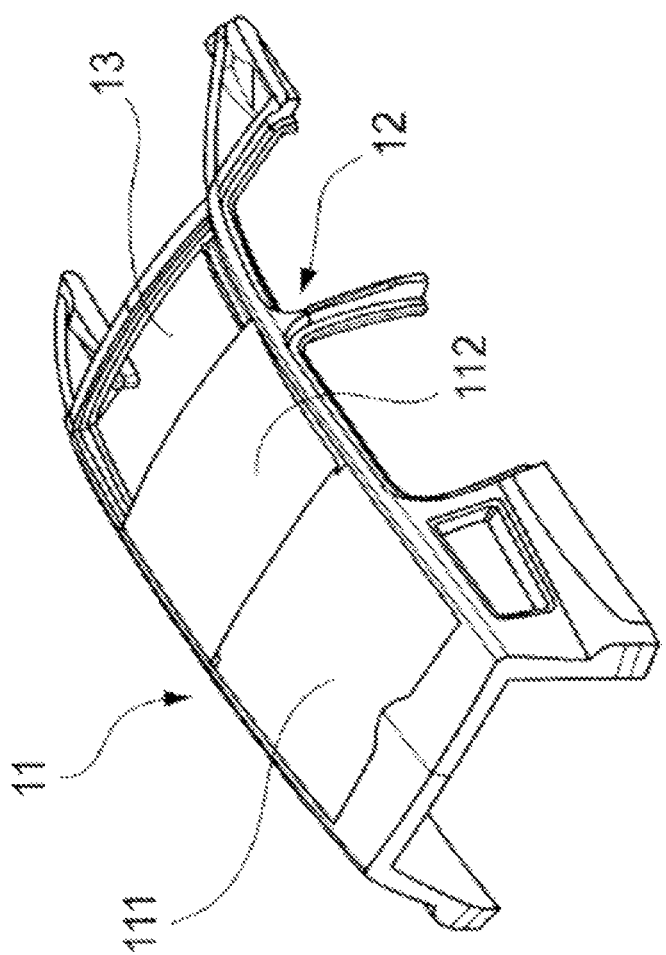
Figure 1C:
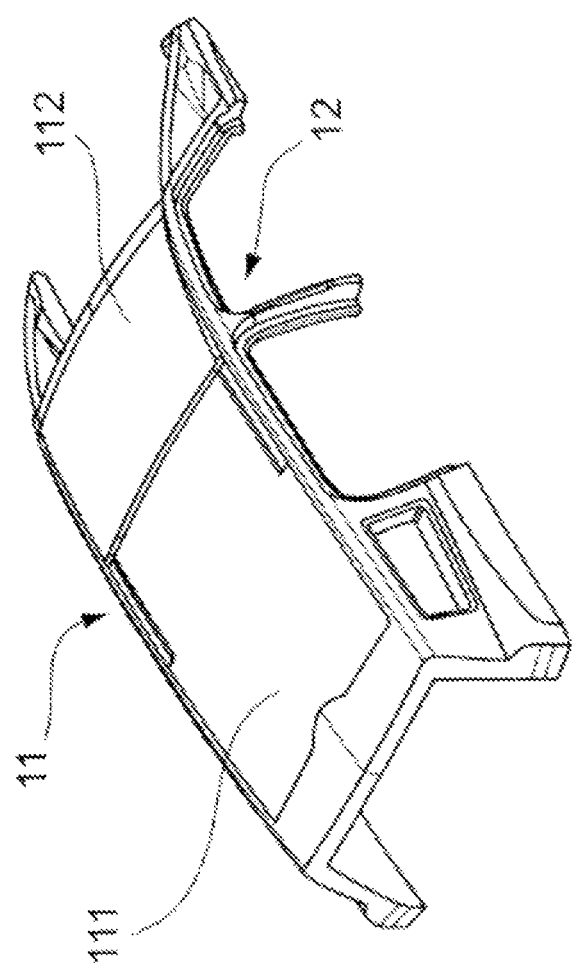

As illustrated in FIGS. 1A to 1C, the glazed roof is a pre-assembled set 11 comprising:
   a fixed panel 111, the edges of which are sized in order to be fixedly attached, for example by gluing, to the corresponding edges of the bodywork 12 of the vehicle, or of its chassis, of which only the upper part is illustrated;
   a mobile panel 112 capable of being moved relative to the fixed panel 111 to close off or release an opening 113 defined beside the fixed panel 111;
   means described in greater detail here below (rails, pins, tracks, link rods, motor drive unit, etc) making it possible to control the movement of the mobile panel 112.

In a known way, in order to release the aperture 13, the mobile panel 112 is capable of being moved towards the rear of the vehicle by sliding in rails fixedly attached to the fixed part and situated on either side of the mobile panel.

In the closed position illustrated in FIG. 1A, the mobile panel 112 is in the plane or in the continuity of the fixed part 111. It closes off the aperture 13 made in the roof 11 in a tightly-sealed manner, seals (not shown) being provided for this purpose, and is flush with the fixed panel 111, as well as, in this embodiment, with the windscreen of the vehicle. It can also be flush with a transverse part or element, for example a cross-beam.

In the position illustrated by FIG. 1B, the aperture 13 is cleared, the mobile panel 112 having been shifted relative to the fixed panel 111, and placed substantially parallel to it outside the vehicle.

In a manner known per se, the opening from the position illustrated by FIG. 1A is done in two stages: a removal of the mobile panel 112 above the aperture 13, either by a motion along an axis perpendicular to the plane defined by the fixed panel 111 or by a swinging motion and then by a movement in translation, or sliding.

It must be noted that the terms "plane", "parallel" and "perpendicular" must herein be understood in the broad sense. Indeed, as can be seen in the figures, the roof 11 can be appreciably incurvated in one or more directions. In this case, the "plane" must be understood as being the reference surface (incurvated surface) defined by the roof.

Apart from this opening motion, it is provided according to the invention that the mobile panel 112 will be capable of being tilted, about an axis situated appreciably in the plane of the fixed panel 111, towards the front of the vehicle as illustrated by FIG. 1C, in order to take its partially open position.

According to the invention, these different motions of the mobile panel are controlled by means for the moving of two shuttles, one on each side of the roof, mobile in only one direction, along inside rails provided for this purpose.

FIGS. 2A to 3C more specifically illustrate the working of the device of the invention according to a preferred embodiment.

FIGS. 2A to 2E schematically represent the part of the mobile panel that is closest to the front of the vehicle, called the distal end, and one of the corresponding rails (a second identical rail being placed on the other side of the vehicle).

Figure 3A:
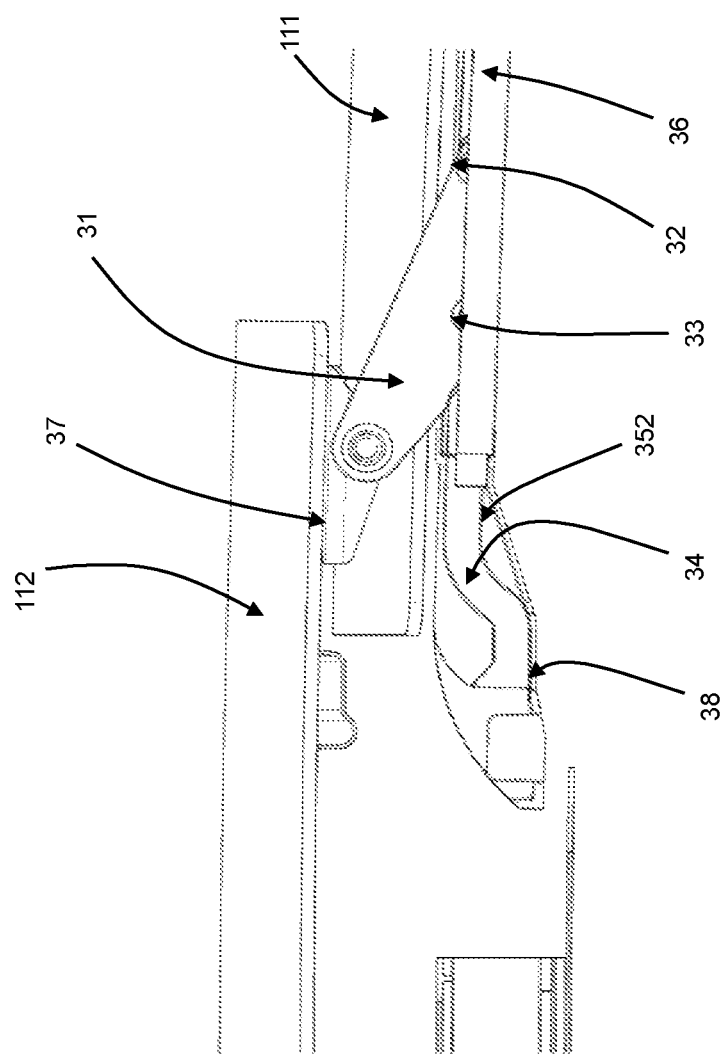
Figure 3B:
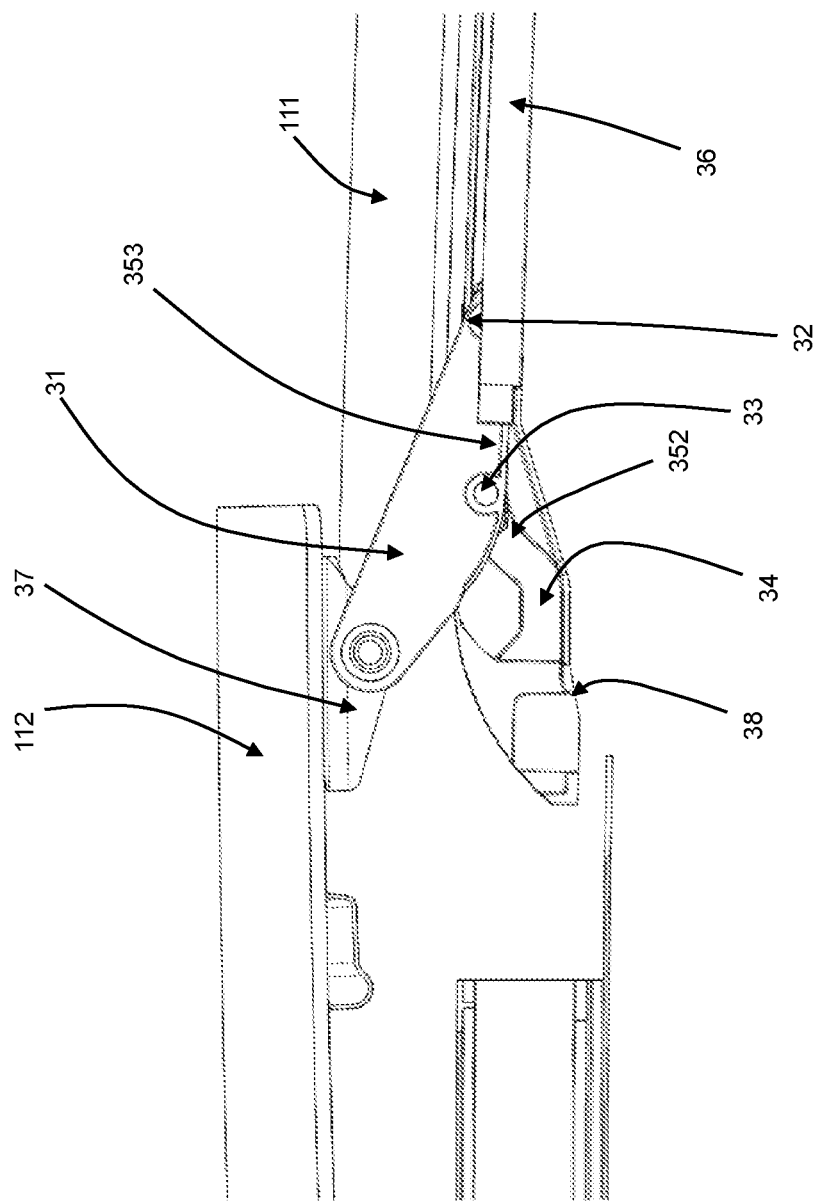
Figure 3C:
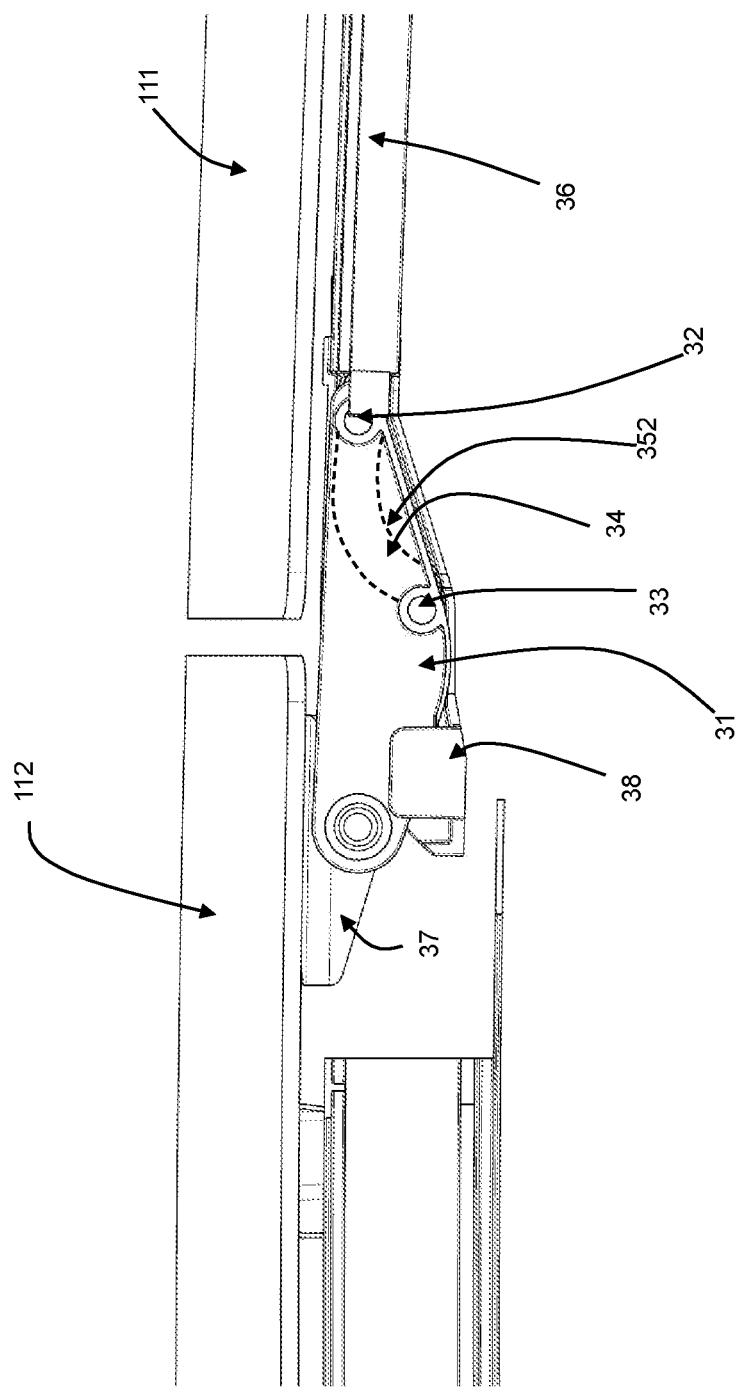
Figure 4:
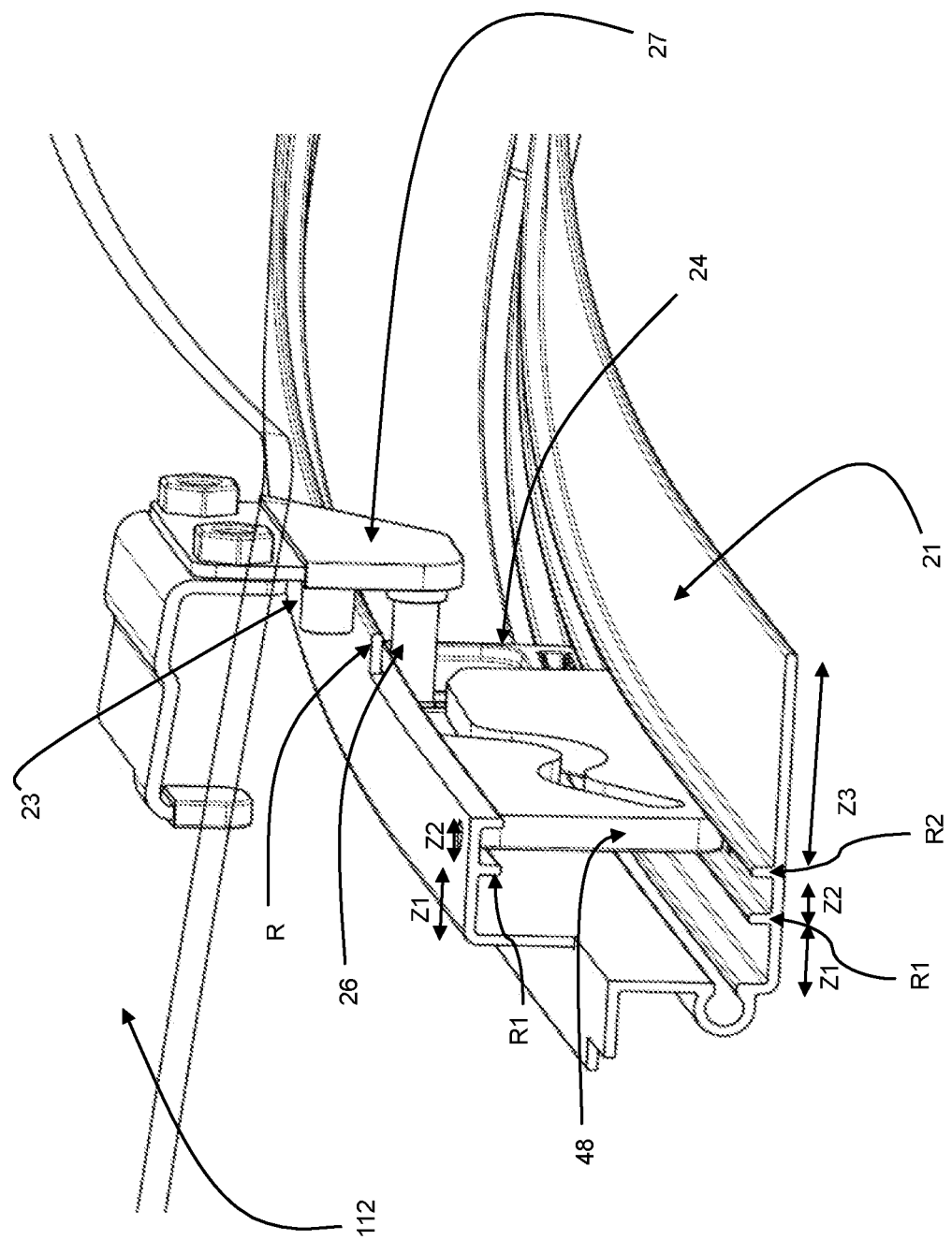
FIGS. 4 and 5 are respectively a partial view in perspective and in section of means providing for the mobility of the mobile panel at the distal end of the vehicle, the mobile panel being in the sliding plane.

FIGS. 3A to 3C represent the other side of the mobile panel, called the proximal end, and the corresponding rail.

In the embodiment illustrated, the first rail 21 has a "C" shaped section that can be seen in FIGS. 4 to 9. The upper and lower parts of the rail 21 comprise two zones Z1, Z2, that are parallel to the axis of the rail 21 and are demarcated by the ridges or lips R1, R2 which extend along the length of the rail 21. The lower part of the rail comprises a third zone Z3 parallel to the axis of the rail 21. These three zones extend along the length of the rail 21.

A termination part 48 (or tip) is placed fixedly at the end of the first rail 21, in the central zone, called a second zone Z2. A track 22, called a first track, which comprises an "S" shape, is formed in this part 48 which is made for example of plastic (making it possible, by molding for example, to define the complex shape of the track 22). This track 22 comprises four portions, namely a first inclined portion 221 that is prolonged by a second portion 222 inclined in an opposite direction, the second portion 222 being prolonged by a third portion 223 inclined in the direction opposite to the second portion 222 and the third portion 223 being open at one of its ends and being prolonged by a fourth portion 224 parallel to the axis of movement of the shuttle 24.

A shuttle 24 (or slide) is mobile in translation in the first zone Z1 of the rail 21. This first zone Z1 forms a channel for guiding the shuttle 24 in translation. This shuttle 24 bears a track 25, called a second track, comprising a first portion 251 extending transversally to the axis of movement of the shuttle 24 and a second portion 252 extending in parallel to the axis of movement of the shuttle 24 from the first portion 251. The track 25 which is "L"-shaped guides a first pin 26 (or shaft or finger), called a driving pin for driving the mobile panel, fixedly attached to the mobile panel 112, by means of a linking part 27 (or plate or flange). This linking part 27 bears a supporting element in the form of a second pin 23, called a supporting pin or a support of the mobile panel, which is implemented (or "active") in the sliding position of FIGS. 2A and 2B (corresponding to the position of FIG. 1B). This pin 23 is "inactive" in the partial opening, swinging, and closed positions of the mobile panel.

As can be seen especially in FIGS. 4 to 8, the driving pin 26 extends on the three zones Z1 to Z3 of the rail 21. It cooperates with the first track 22 of the termination part 48 and the second track 25 of the shuttle 24. The supporting pin 23, of a length smaller than that of the driving pin 26, extends in the third zone Z3 of the guide rail 21 and cooperates with none of the two remaining tracks 22, 25.

According to the approach of the invention, this shuttle 24 moves in only one direction along the zone Z1 of the rail 21 (arrow F1 of FIG. 2C), this movement making it possible to obtain the different motions of the mobile panel 112 through the different pins 23, 26, the different tracks 22, 25 and the use of a shoulder R on the rail 21.

In the sliding position of the mobile panel 112 (FIG. 2A), the shuttle 24 is moved in the rail 21, the driving pin 26 being situated in the first portion 251 of the track 25 of the shuttle 24, and more specifically abutting a first end of the first portion 251 (which is perpendicular to the axis of the rail 21).

Again in this sliding position, the supporting pin 23, the length of which is smaller than that of the driving pin 26, is in contact with a shoulder R formed on the upper part of the rail 21 and parallel to the axis of the rail. The cooperation of the supporting pin 23 and the shoulder R helps in the sliding of the mobile panel 112 above the fixed panel 111 to release the aperture 13 prepared in the roof 12.

It can be noted that the shoulder R does not extend up to the distal end of the rail 21 and that the termination part 48 is placed in the rail 21 in such a way that the shoulder R overlaps the fourth portion 224 of the track 22, this fourth portion 224 being parallel to the axis of movement of the shuttle 24.

The closing of the mobile panel 112 first of all includes a sliding from right to left in FIGS. 2A to 2E, to bring this mobile panel to the vicinity of the aperture.

Figure 2A:
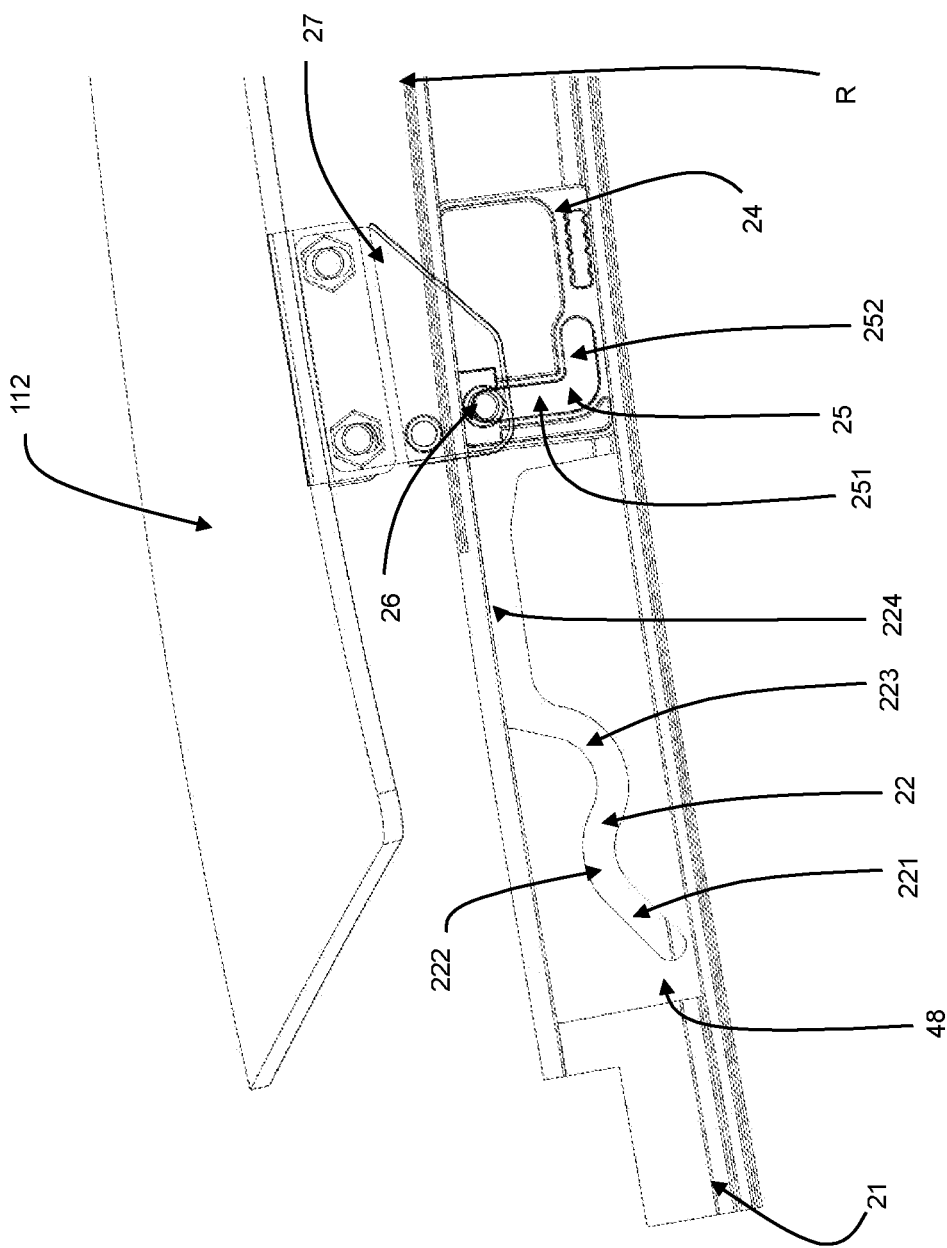
Figure 2B:
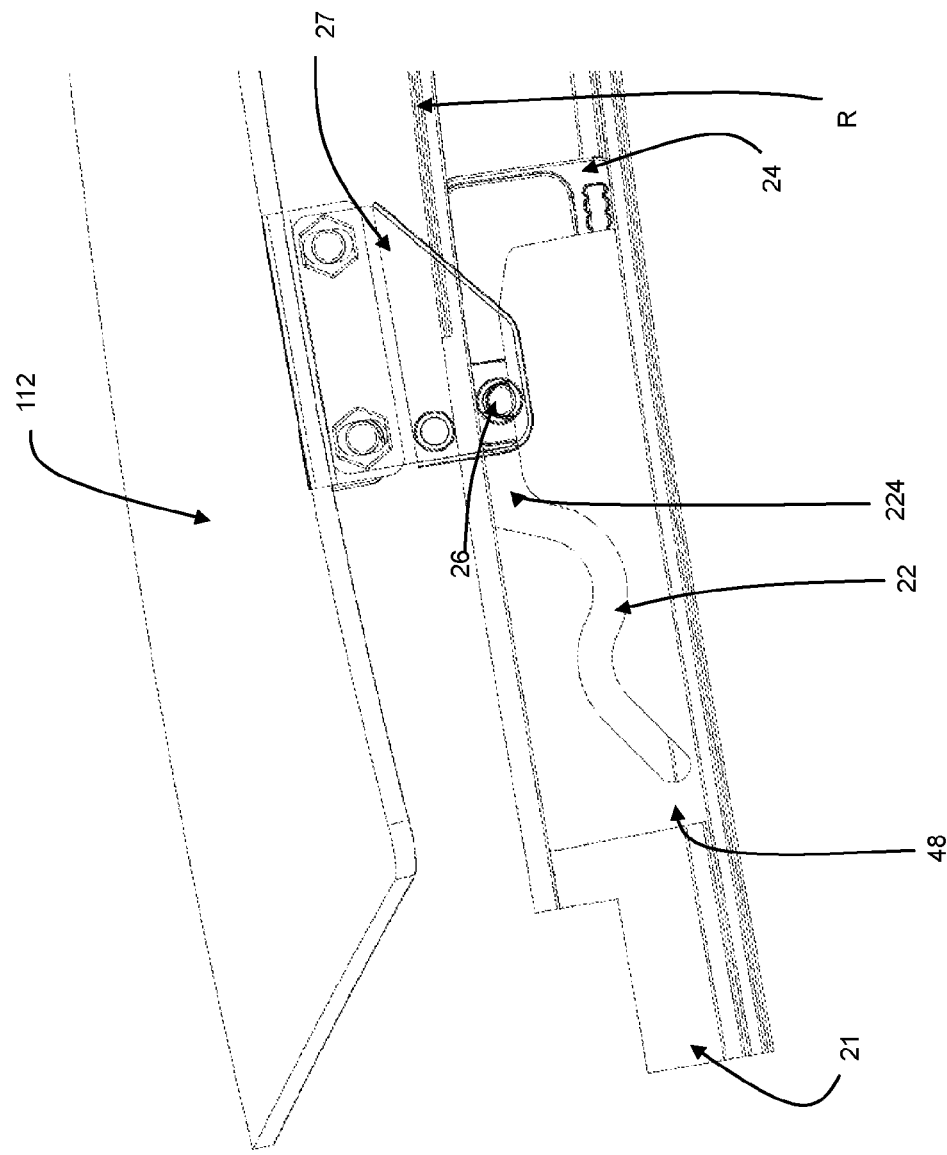

Thereafter, as can be seen in FIG. 2B (sliding position), the driving pin 26, which is still abutting a first end of the first portion 251 of the second track 25, cooperates with the fourth portion of the first track 22 of the termination part 48. At the same time, the second pin 23 (which cannot be seen in FIG. 2B) is supported on the shoulder R of the rail 21. In the position illustrated in FIG. 2B, the termination part 48 and the shuttle 24 overlap without being in contact.

Figure 2C:
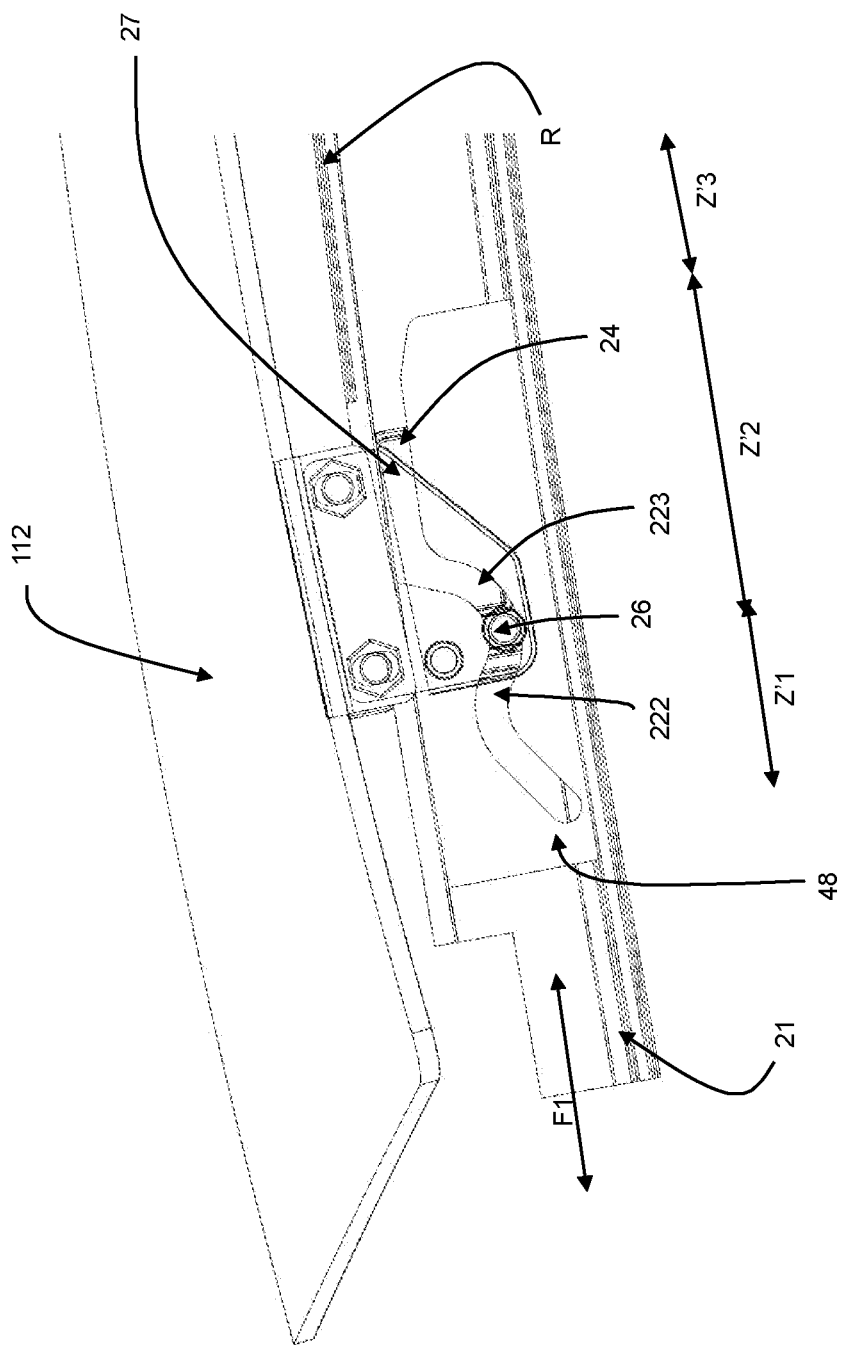

As and when the mobile panel 112 moves towards the distal end of the vehicle, i.e. from right to left in the FIGS. 2A to 2E, the shuttle 24 moves in parallel to the rail 21 towards this distal end and the driving pin 26 is guided in translation in the third portion 223 of the track 22 which is inclined relative to the axis of the rail 21. Because of its shape, the third portion 223 drives the pin 26 downwards relative to the axis of the rail 21 (FIG. 2C). Consequently, the pin 26 moves downwards relative to the axis of the rail 21 in the first portion 251 of the track 25 of the shuttle 24. At the same time, the supporting pin 23 is no longer in contact with the shoulder R of the rail 21 (it is therefore "inactive").

Figure 5:
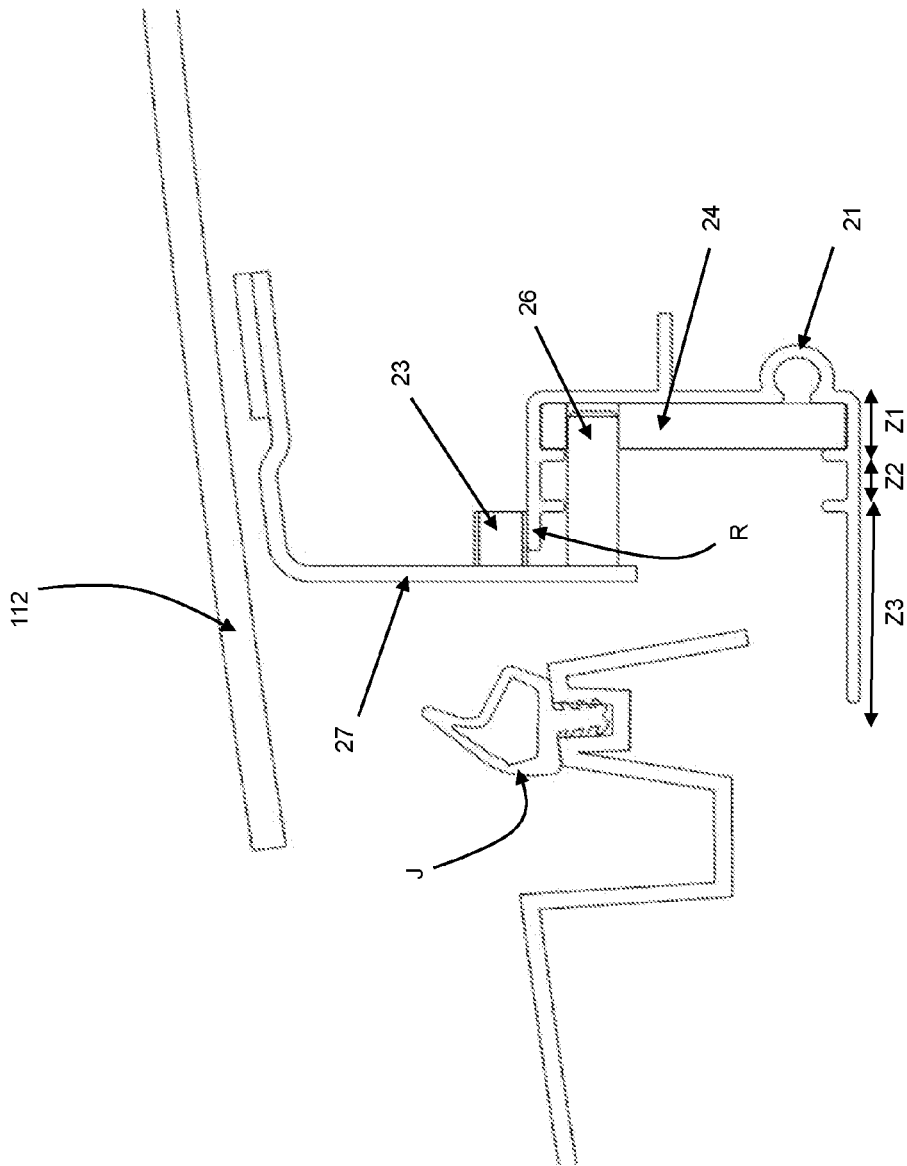
Figure 6:
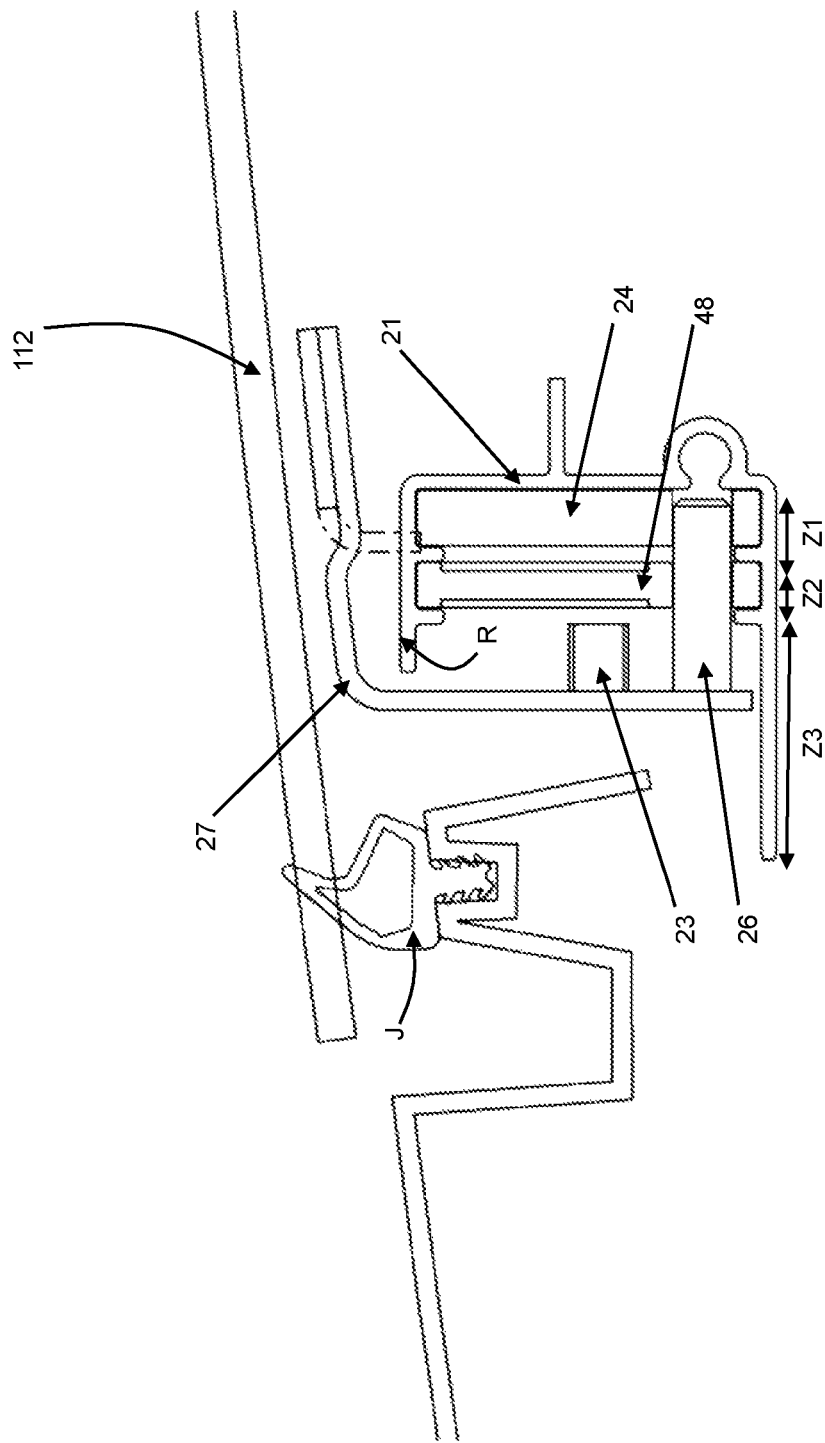
FIGS. 6, 7 and 8 are a view in section, a partial view in perspective and a top view of the means providing for the mobility of the mobile panel at the distal end of the vehicle, the mobile panel being in a closed position, the aperture being closed off.
Figure 7:
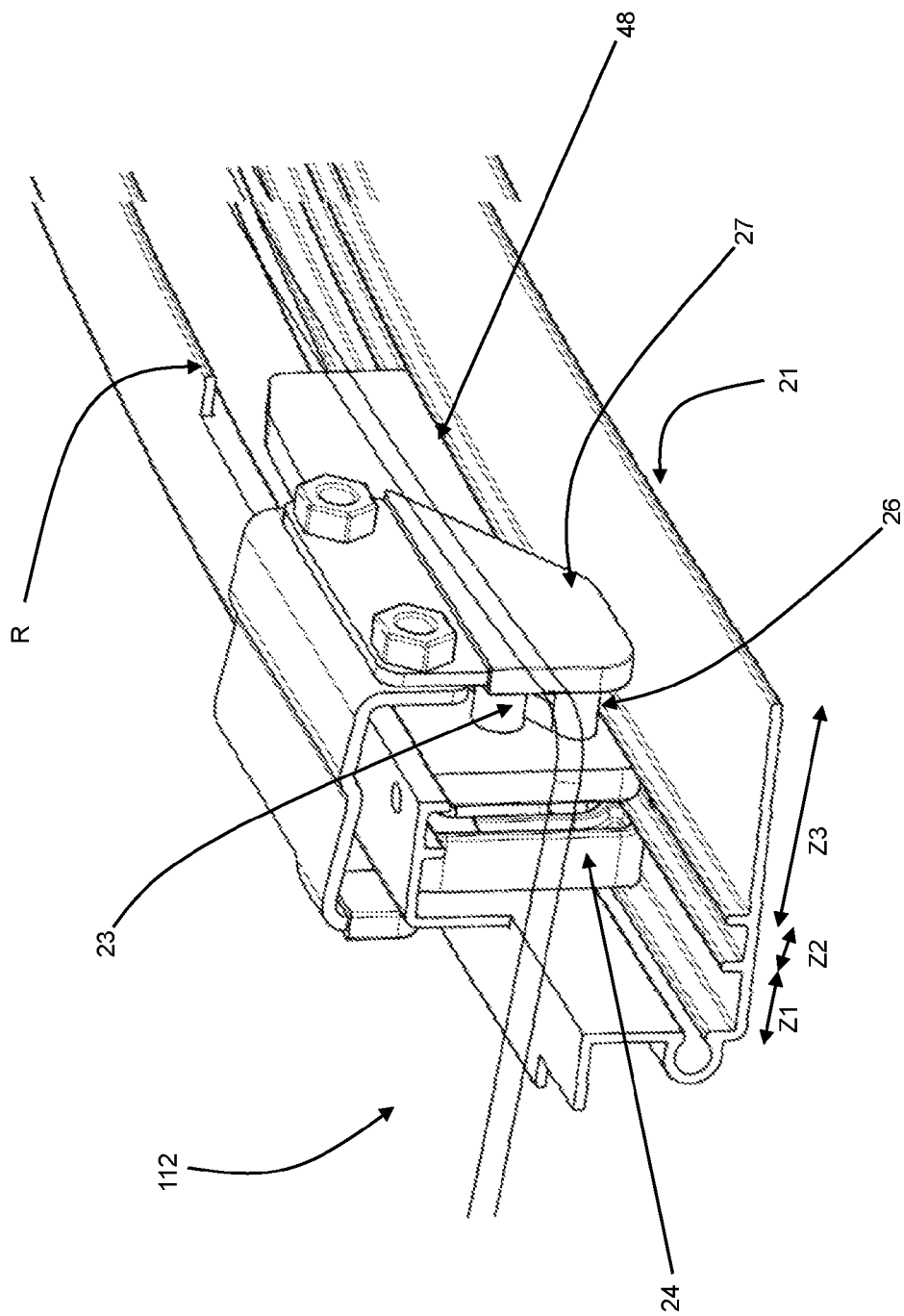
Figure 8:
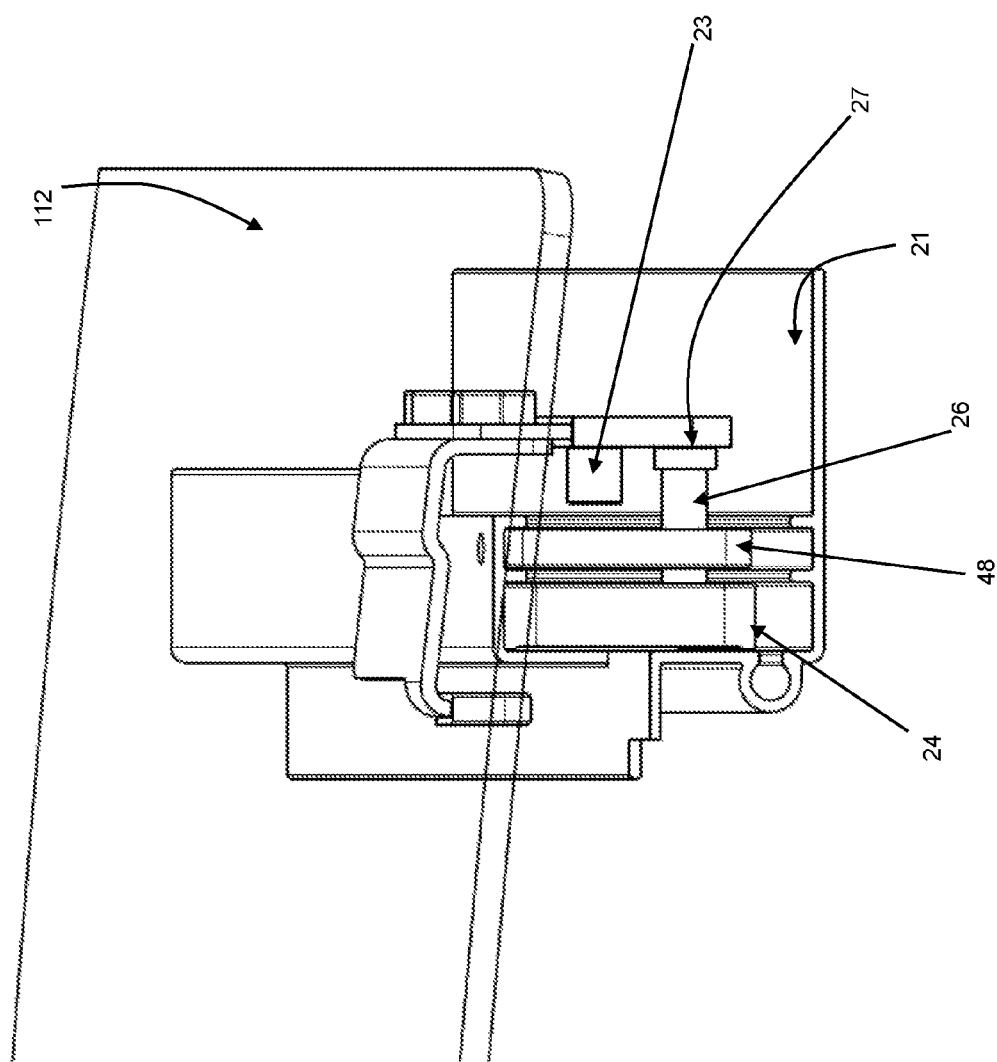
Figure 9:
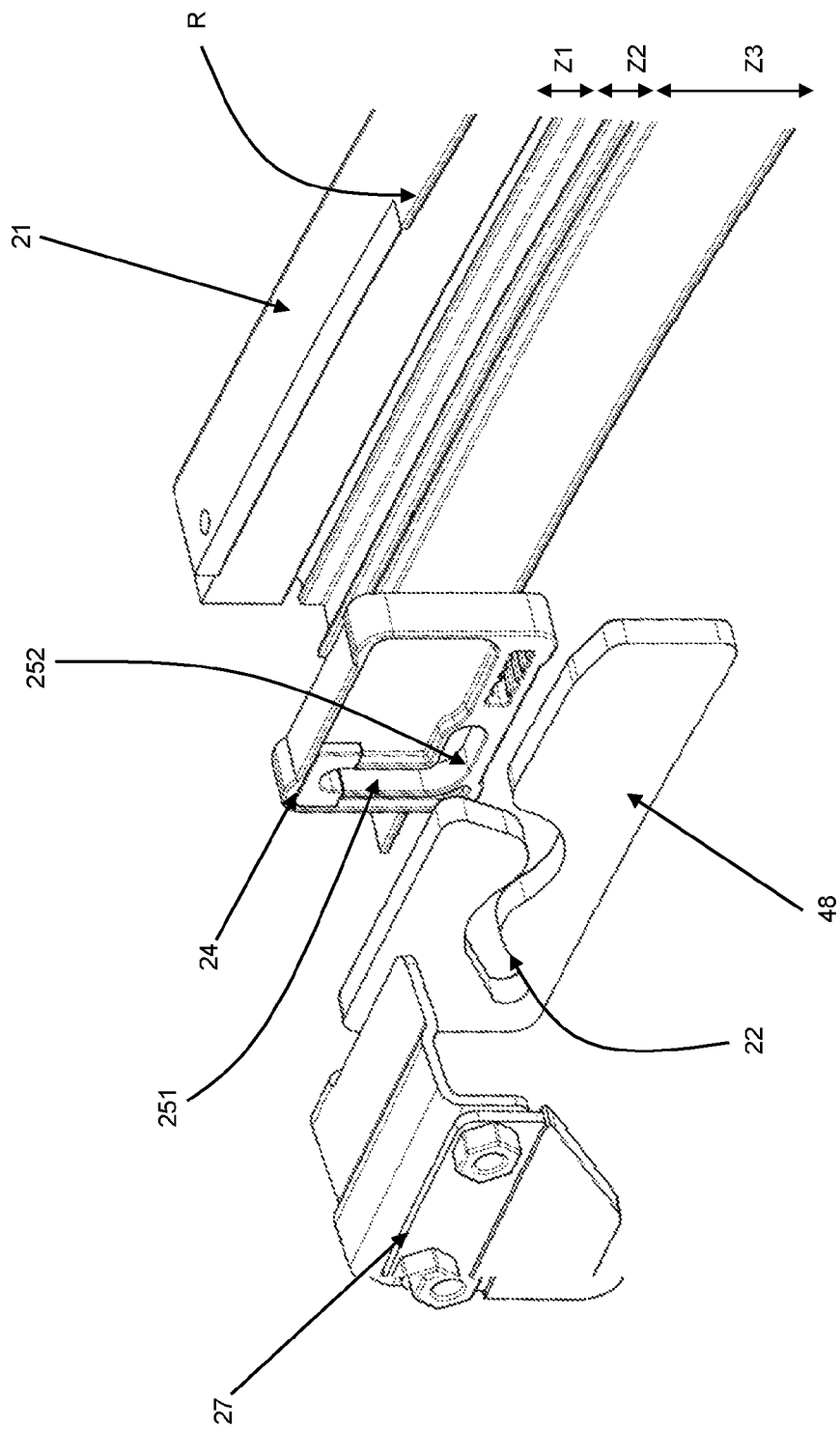
FIG. 9 is an exploded view of the means providing for the mobility of the mobile panel at the distal end of the vehicle.

This will cause the lowering of the distal end of the mobile panel (FIG. 2C) so that it gradually comes into a position of leaning against the shoulder or the corresponding seal J (which can be seen in FIGS. 5 and 6). In other words, this causes the tilting of the mobile panel.

Thus, by means of its pin 26 which moves in the track 22, the linking part 27 and therefore the mobile panel 112 tilt slightly to take the partially open position (FIG. 2C).

Figure 2D:
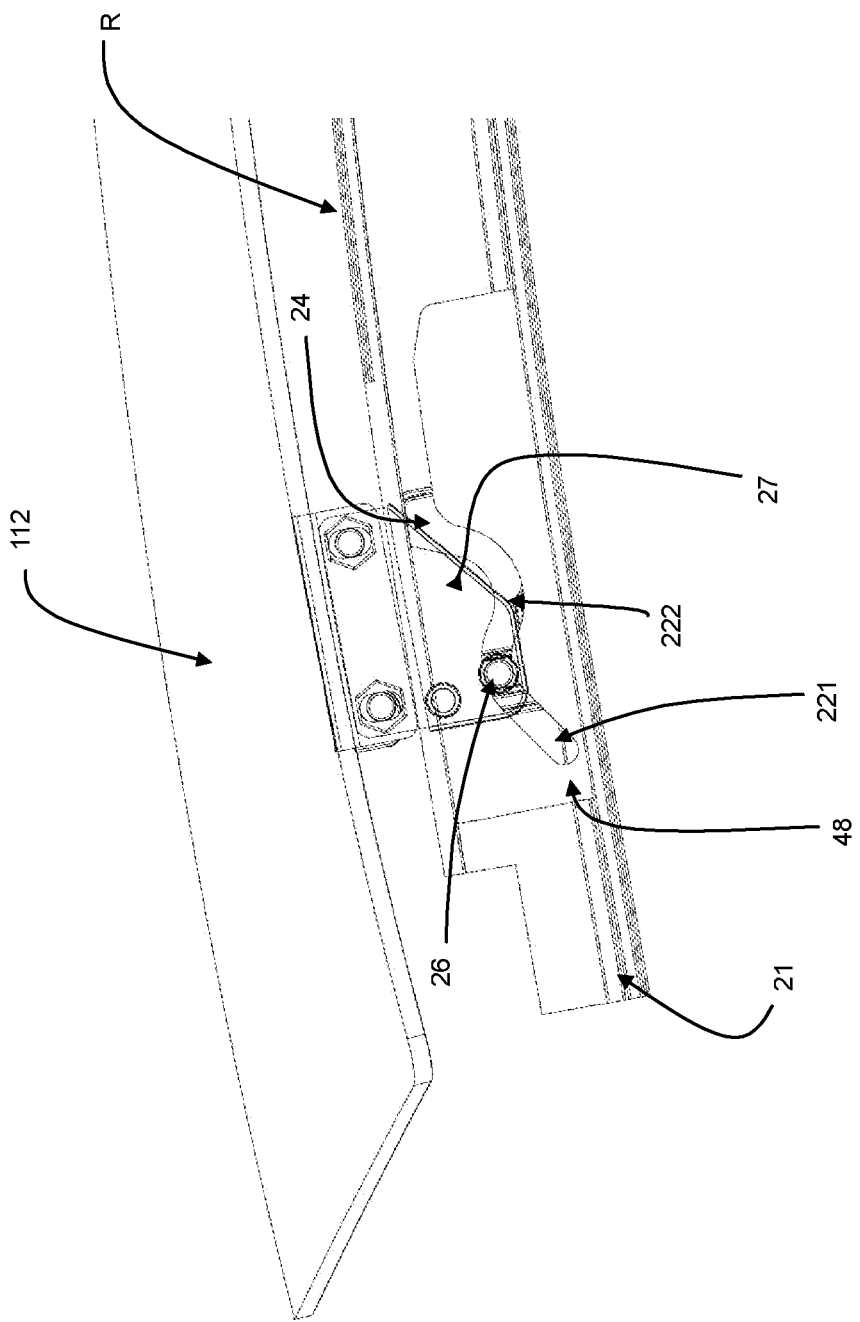

In FIG. 2D, the shuttle 24 moves again parallel to the rail 21 and the driving pin 26 is guided in translation in the second portion 222 of the track 22, which drives the driving pin 26 upwards, relative to the axis of the rail 21. Furthermore, the driving pin 26 moves upwards, relative to the axis of the rail 21 in the first portion 251 of the track 25 of the shuttle 24.

This will cause the lowering of the proximal end of the mobile panel 112 so that the mobile panel is parallel to the aperture (FIG. 2D), and prompts a decompression of the seal J. This decompression of the seal limits friction and therefore limits wear and tear on the seal.

The shuttle 24 still moves in parallel to the rail 21, the first portion 221 of the track 22 drives the driving pin 26 downwards, relative to the axis of the rail 21, and the mobile part 112 is lowered. Furthermore, the driving pin 26 moves downward relative to the axis of the rail 21 in the first portion 251 of the track 25 and then from left to right, parallel to the axis of the rail 21, in the second portion 252 of the track 25 of the shuttle 24.

When the mobile panel 112 is completely closed (FIGS. 2E, 7 and 8), the driving pin 26 is abutting the closed end of the track 22 of the termination part 48 and in the second portion 252 of the track 25 of the shuttle 4. At the same time, the supporting pin 23 is not in contact with any other part (it is "inactive").

Figure 2E:
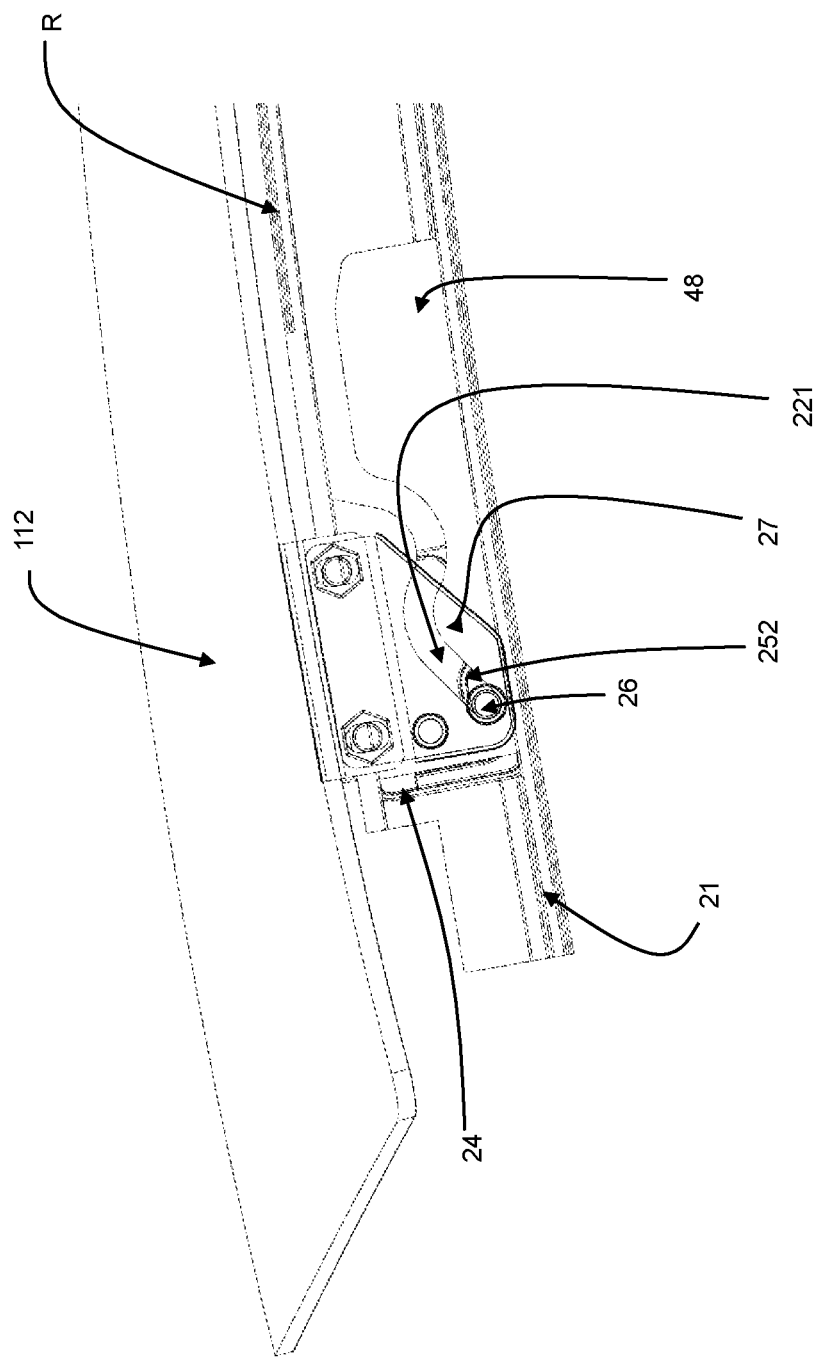

To obtain the partial opening from this closed position of FIG. 2E, the shuttle 24 is moved in the rail 21 from left to right. This is illustrated by FIGS. 2D and 2C.

It can therefore be seen that, with a motion of the shuttle 24 in only one direction (parallel to the rail), which can be easily motor driven, for example by means of a "push/pull" cable, the different motions of the mobile panel 112 can be controlled. In a first zone Z'1 (FIG. 2C), this motion of the shuttle controls the partial opening. In a second zone Z'2, it controls the opening (swinging and sliding). In a third zone Z'3, it controls the sliding.

At the same time, the other end or proximal end of the mobile panel 112 must also be guided in a way linked to the motion of the shuttle. As illustrated in FIGS. 3A to 3C, in this embodiment, this is ensured by means of a link rod 31, the movement of which is controlled by means of a third pin 32 and a fourth pin 33 moving in a track 34 formed in a second rail 36, or at least at the end of this rail.

In the embodiment illustrated, a termination part 38 is placed at the end of the rail 36. The end of the track 34 is formed in this part 38, for example out of plastic (thus making it possible, for example by molding, to define the complex shape of the track). The end of the track 34 can also be formed directly in the rail 36.

The other end of the link rod 31 is mounted so as to be mobile in rotation on a linking part 37 linked to the mobile panel 112.

In FIG. 3A, the mobile panel is practically in the sliding position. In this position, the third and fourth pins 32 and 33 are situated in a rectilinear portion 353 of the track 34 parallel to the axis of the rail 36. In other words, the pins 32 and 33 are aligned in an axis appreciably parallel to the axis of the rail 36.

The link rod 31 is therefore held with a constant inclination, chosen so that the mobile panel 112 is appreciably parallel to the fixed panel 111.

When the mobile panel 112 is in its closed position, illustrated by FIG. 3C, the fourth pin 33 moves in an inclined portion 352 of the track 34 downwards while the third pin 32 moves in the rectilinear portion 353 of the track 34 leftwards. Consequently, the link rod 31 tends to get lowered and to get aligned substantially with the axis of the rail 36. This causes the lowering of the linking part 37 and therefore of the proximal end of the mobile panel 112 which gets placed so as to be flush with the fixed panel 111.

When the shuttle 24 is moved into the partially open position (FIG. 2C), a tilt is applied to the mobile panel 112, causing it to be raised relative to the fixed part of the proximal end of the mobile panel 112. This drives the link rod 31 which straightens up (FIG. 3B), the fourth pin 33 moving in the inclined portion 352 of the track 34 upwards while the third pin 32 moves in the rectilinear portion 353 of the track 34 rightwards. The mobile panel is thus held in its partially open position.

Naturally, the movement of the shuttle 24 in the other sense, in the zone Z'1 (FIG. 2C) again causes the closing of the mobile panel.

In the embodiment illustrated, the mobile panel takes position beside the fixed part to form the glazed roof (in the closing-off position).

In other embodiments, the fixed part can have an outline corresponding to the outline of the roof, the aperture being then defined in this fixed part.

An aim of an embodiment of the invention is to provide a glazed device for closing off a bay or opening formed in a motor vehicle, and especially a glazed roof, in which the mobile panel can be partially opened or moved slidingly in a simple, efficient and reliable way.

Thus, it is a goal of an embodiment of the invention to provide a technique for enabling the partial opening and sliding by using means that have limited space requirement and weight as well as a small number of parts.

It is another goal of an embodiment of the invention to provide a technique of this kind that enables an actuation or a motor drive, at least in a certain embodiment, that is particularly simple.

Yet another goal of an embodiment of the invention is to maximize the glazed surface or surface allowing light transmission.

The invention claimed is:

1. A motor vehicle glazed roof comprising:
   a fixed part; and
   a mobile panel that is mobile relative to the fixed part, and configured to close off an aperture formed in or beside said fixed part in a closing-off position,
   wherein movement of said mobile panel is implemented by first and second shuttles respectively guided in translation in first and second rails, each of said shuttles cooperating with a respective pin that is fixedly attached to said mobile panel,
   wherein said mobile panel bears first and second supporting elements that take support on supporting surfaces formed respectively on a longitudinal portion of said rails defining a zone of movement in which said mobile panel is movable in sliding relative to said fixed part, parallel to the rails,
   said supporting surface being interrupted in an end portion of each of said rails so as to enable a movement of said supporting elements in a direction perpendicular to said rails, wherein said end portions of each of said rails are provided with a termination part that bears a first track configured so that, when the shuttles are moved in said rails, they provide a motion of tilting and/or a motion of swinging of said mobile panel, wherein said mobile panel is fixedly attached, in the vicinity of its proximal end, to link rods enabling control, complementarily to said respective pins, of the tilting of the mobile panel, and wherein said first track has an "S" shape defining three portions inclined relative to the axis of movement of said shuttle.

2. The motor vehicle glazed roof according to claim 1, wherein the movement of said shuttles in said end portions provides:

in a first zone of movement, for a motion of a tilting of said mobile panel relative to said fixed part, when said pin moves in a first portion and a second portion of said first track, and in a second zone of movement, a motion of swinging of said mobile panel when said pin is moved in a third portion and a fourth portion of said first track.

3. The motor vehicle glazed roof according to claim 1, wherein the pin has a length greater than that of said supporting elements.

4. The motor vehicle glazed roof according to claim 1, wherein said first track is open at one of its ends, so as to get detached from the pin during the passage into said third zone.

5. The motor vehicle glazed roof according to claim 1, wherein each of said shuttles bears a second track cooperating with said pin fixedly attached to said mobile panel.

6. The motor vehicle glazed roof according to claim 5, wherein said second track has a general "L" shape.

7. The motor vehicle glazed roof according to claim 1, wherein that said respective pins and supporting elements are carried by a flange connected to said mobile panel in the vicinity of a first end of this panel, called a distal end.

8. A motor vehicle comprising:

a glazed roof attached to a body of said motor vehicle, wherein said glazed roof comprising:
  a fixed part; and
  a mobile panel that is mobile relative to the fixed part, and configured to close off an aperture formed in or beside said fixed part in a closing-off position, wherein movement of said mobile panel is implemented by first and second shuttles respectively guided in translation in first and second rails, each of said shuttles cooperating with a pin that is fixedly attached to said mobile panel, wherein said mobile panel bears first and second supporting elements that take support on supporting surfaces formed respectively on a longitudinal portion of said rails defining a zone of movement in which said mobile panel is movable in sliding relative to said fixed part, parallel to the rails, said supporting surface being interrupted in an end portion of each of said rails so as to enable a movement of said supporting elements in a direction perpendicular to said rails, wherein said end portions of each of said rails are provided with a termination part that bears a first track configured so that, when the shuttles are moved in said rails, they provide a motion of tilting and/or a motion of swinging of said mobile panel, and wherein said mobile panel is fixedly attached, in the vicinity of its proximal end, to link rods enabling control, complementarily to said respective pins, of the tilting of the mobile panel, and wherein said first track has an "S" shape defining three portions inclined relative to the axis of movement of said shuttle.

* * * * *